Oct. 11, 1949.  J. BOUCHER  2,484,605
EPICYCLOIDAL TRAIN OF FRICTION MECHANISM
Filed July 18, 1946
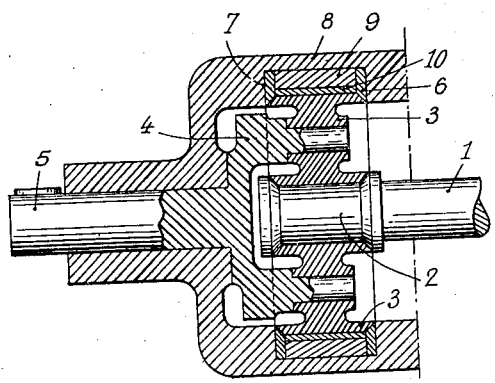
Jacques Boucher
INVENTOR
By [signature]
his ATTY.

Patented Oct. 11, 1949

2,484,605

UNITED STATES PATENT OFFICE 2,484,605

EPICYCLOIDAL TRAIN OF FRICTION MECHANISM

Jacques Boucher, Paris, France, assignor to Compagnie De Pont A Mousson, Nancy, France Application July 18, 1946, Serial No. 684,478
In France May 10, 1943

Section 1, Public Law 690, August 8, 1946
Patent expires May 10, 1963

3 Claims. (Cl. 74—798)

1

The invention refers to an epicycloidal train of friction mechanism able to be utilised as reducer or increaser of speeds of the known type, comprising a central shaft, driving or driven, in frictional contact with planet friction rollers, the whole surrounded by a distorted ring, made of special steel, forming a band, the inner diameter of which is slightly smaller than the circumscribed circle tangent at the outer surface of the friction-rollers. The distorted ring, forming a band, ensures tightening of the pressure between the rollers and the central shaft and, thereby, the friction required for transmission of the movement, by increasing it or by reducing it, according as the system is for increasing or for reducing speeds.

In such a device, calculation shows and experience confirms that the band working in alternate flexion, is the part developing the most fatigue. Such is the case, for instance, when the device has to revolve at high speed and more particularly still, in a multiplier of a centrifugal compressor at a speed equal to or greater than 20,000 r. p. m. for example.

The object of the present invention is a band that can be distorted, the life of which is considerably increased when compared to that of a similar band, made in a single piece.

It is known that in an epicycloidal friction system, in order to limit wear, it is necessary for the surfaces of the elements in contact (axles, friction-rollers, interior track of the distortable ring) to possess the greatest hardness possible. That indispensable hardness is realised by subjecting the steel to a hardening process but by so doing, the resilience is considerably decreased, such resilience being the approximate index of the fragility at the alternated flexions.

Furthermore, for an equal distorsion, the fatigue is proportional to the thickness of the ring.

Finally, the degree of treatment, aiming at obtaining more or less hardness or resistance of the steel, has a small influence on the coefficient of flexibility from which depends the resulting effort applied by the satellites on the central shaft.

The best ring obtainable therefore, must comply with the following conditions which are contradictory:

1. Great degree of hardness
2. Great resilience
3. Small thickness
4. Great strength
5. High coefficient of flexibility

2

The invention has for object a composite band meeting those conditions, and which is formed of at least two concentric rings, to wit: a thick outer ring, of great resilience, and a thin inner ring with a great degree of hardness.

Calculation shows and experience confirms that a band made in such manner with several thicknesses and of metals of suitable shades, treated in an appropriate manner, possesses considerably greater life than a band executed with a single thickness.

Other characteristics of the invention will be evident from the description which follows. By referring to the drawing, showing a sectional view of an epicycloidal train of mechanism according to the invention, 1 indicates the central shaft which ends in a seating 2, forming a sun device on which rest planet friction-rollers 3 carried in rotation by a driving means 4, integral with a shaft 5, coaxial with the shaft 1. The friction-rollers 3 are provided with bevelled parts cooperating with abutment rings 6 and 7.

According to the invention, the band or distortable ring, fitted between the friction-rollers 3 and the casing 8 which forms an orbit device, is made up of two coaxial rings 9 and 10.

The outer ring 9 is the thicker; it is intended to back up the friction ring 10 and to give an important radial pressure between the friction-rollers 3 and said ring 10 and the central shaft 1, this being necessary so as to avoid slipping between those parts. The thickness is calculated in consequence, taking into account the distorsion necessary to obtain the maximum efficiency of the system. That element is made of suitable quality steel treated to a low degree of hardness so that the metal can possess the maximum resilience.

By way of an example, the ring 9 can be made of "nickel-chrome-molybdenum" steel (C: 0.10; Cr: 1.45; Ni: 1.20; Mo: 0.25) treated at 825° and tempered at 500°, that steel has a tensile strength of 120 kg./mm.$^2$ and a resilience of 14 kgm.

The inner ring 10, undergoing the same distorsion as the thick ring, has a thickness reduced to the minimum permitted by the possibilities of manufacture; that element is fitted without any loose play, into the thick ring 9. It is intended to offer the hardest possible surface, so as to avoid wear. It is therefore treated accordingly. At that point of hardness there is a minimum resilience but the fatigue is much less than that of the thick ring.

By way of an example, the ring 10 can be made of chrome-steel with the following compositions: C: 1; Si: 0.15 to 0.50; Mn: 0.25 to 0.50; Cr: 1.5. The treatment consists of hardening at 825–850° and tempering at 160°. The mechanical characteristics obtained are as follows: tensile strength: 226 kg./mm.² Brinnel hardness (load 3000 kg.) =626, Rockwell correspondence with diamond cone loaded to 150 kg.=61.

For an interior diameter of 117 mm., the thickness of the ring 9 is for instance, 9 mm. and that of the ring 10 is 2 mm.

In that manner, it is possible to obtain a band in which the hardness of the two rings has the same value.

Naturally, it is possible to build a band of more than two thicknesses without exceeding the limits of the present invention. For instance, it can be made up of 5 or 6 rings of same thickness.

Having now described my invention what I claim as new and desire to secure by Letters Patent is:

1. A friction epicycloidal train comprising in combination a central member provided with a continuous cylindrical sun surface, a first carrier member in coaxial alignment with said central member, a second carrying member surrounding said central member and first carrying member, one of said three members being a driving member whereas another is driven and the third member is immovable, several planet rollers carried by said first carrier member and in friction contact with said cylindrical sun surface around which they are placed, and two endless coaxial rings located in a coaxial recess of the second carrier member, the outer of said rings being the thicker and possessing a great resilience, whereas the inner ring, which constitutes an orbit friction ring, fits exactly in said outer ring, and is as thin as possible, possesses great hardness and has an inner continuous cylindrical surface, the diameter of said surface being less than the diameter of the circumscribed circle passing by the exterior of said planet wheels.

2. A friction epicycloidal train as claimed in claim 1, wherein said outer ring is made of a nickel-chrome molybdenum steel comprising substantially:

| | |
|---|---|
| C | 0.10 |
| Cr | 1.45 |
| Ni | 1.20 |
| Mo | 0.25 | said ring being hardened at about 625° C. and tempered at about 500° C. whereas the inner ring is made of chome-steel comprising substantially:

| | |
|---|---|
| C | 1.00 |
| Si | 0.15 to 0.50 |
| Mn | 0.25 to 0.50 |
| Cr | 1.5 | said inner ring being hardened at about 825–850° C. and tempered at about 160° C.

3. A friction epicycloidal train as claimed in claim 1, wherein the outer ring is formed of several elementary concentric rings.

JACQUES BOUCHER.

REFERENCES CITED

The following references are of record in the file of this patent:

UNITED STATES PATENTS

| Number | Name | Date |
|---|---|---|
| 1,575,252 | Carter | Mar. 2, 1926 |
| 2,344,078 | Brissoult et al. | Mar. 14, 1944 |

FOREIGN PATENTS

| Number | Country | Date |
|---|---|---|
| 516,168 | France | Dec. 3, 1920 |